Feb. 16, 1954  E. C. MESSICK ET AL  2,669,480
CAMPING AND BOAT TRANSPORTING TRAILER
Filed Oct. 31, 1950  4 Sheets-Sheet 1

Inventors
Elbert C. Messick
Ira W. Wright

By Clarence A. O'Brien
and Harvey B. Jacobson
Attorneys

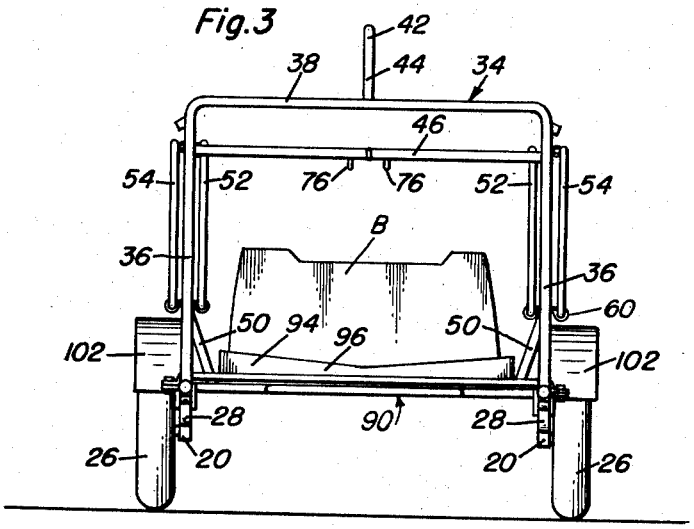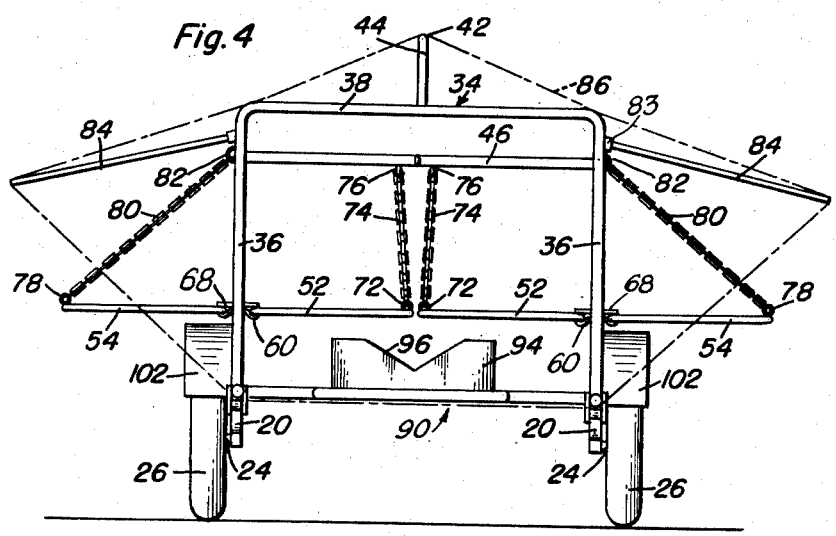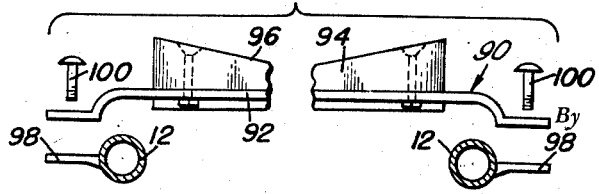

Feb. 16, 1954     E. C. MESSICK ET AL     2,669,480
CAMPING AND BOAT TRANSPORTING TRAILER
Filed Oct. 31, 1950                         4 Sheets-Sheet 3
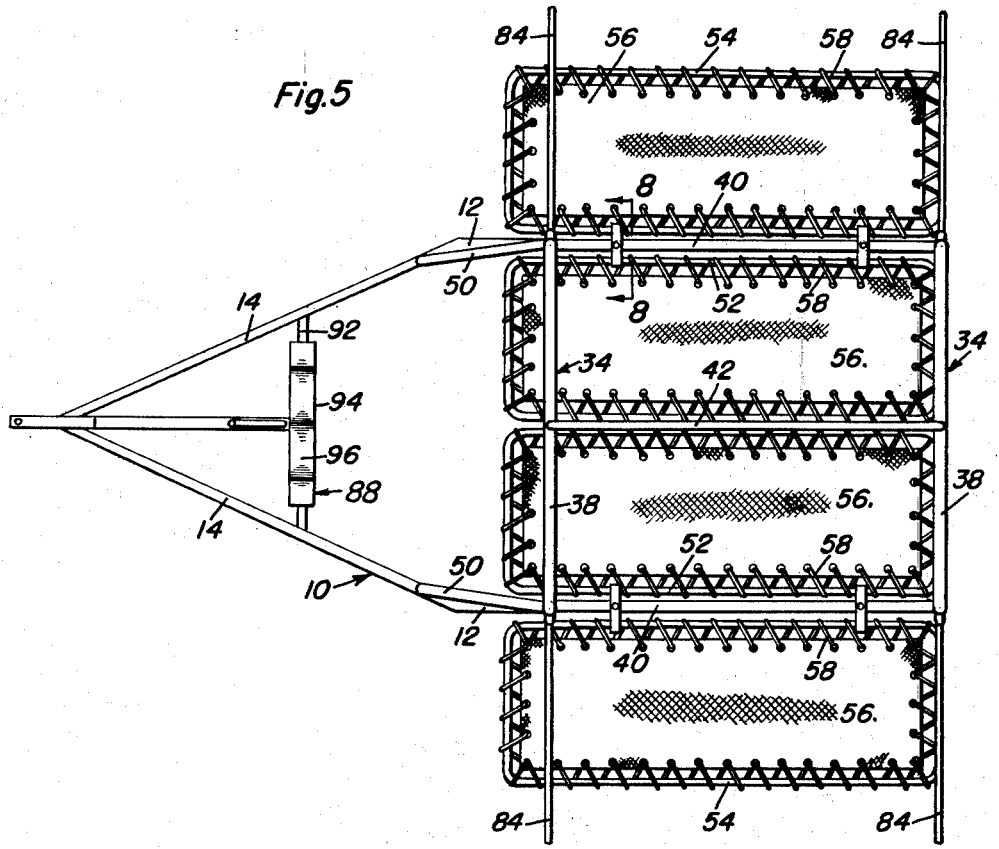
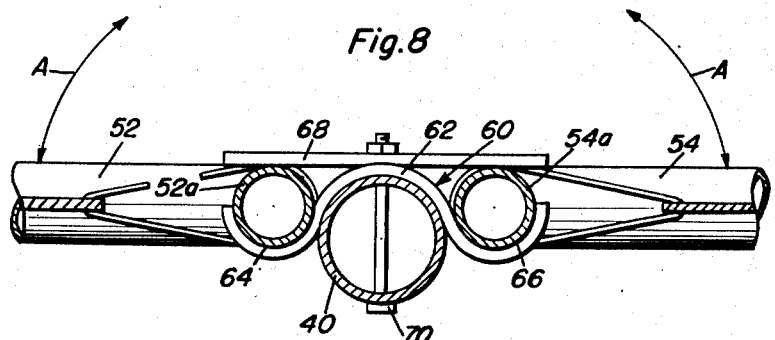
Inventors
Elbert C. Messick
Ira W. Wright
By *Clarence A. O'Brien
and Harvey B. Jacobson*
Attorneys

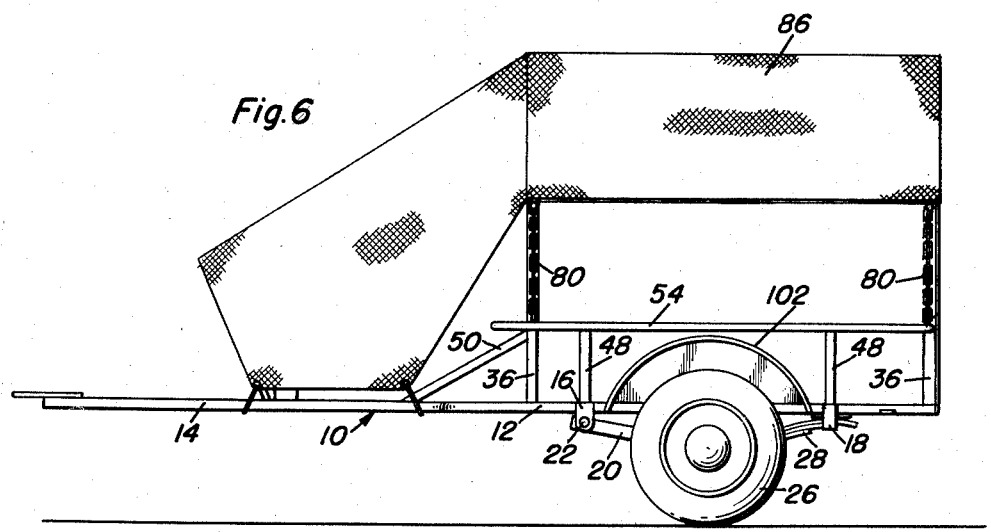
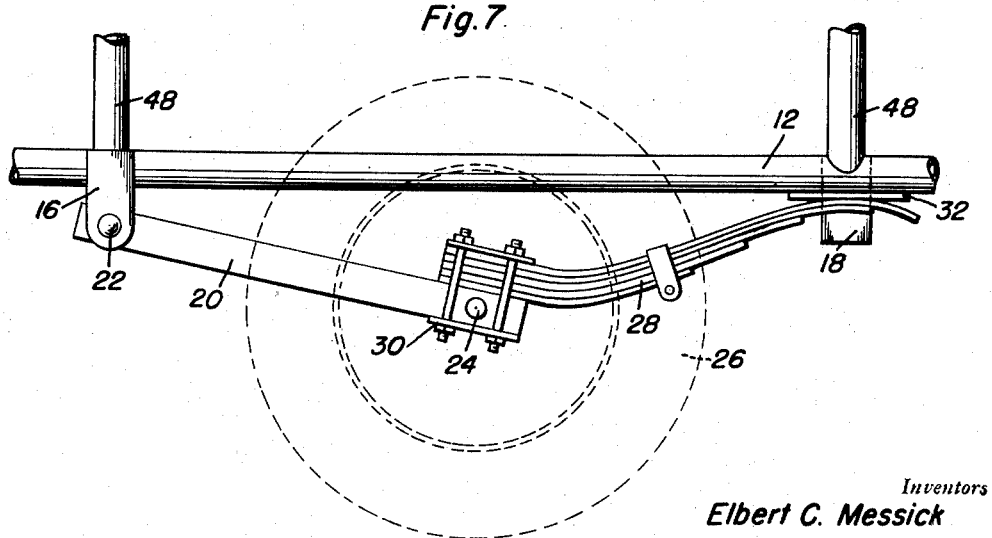

Patented Feb. 16, 1954

2,669,480

UNITED STATES PATENT OFFICE 2,669,480

CAMPING AND BOAT TRANSPORTING TRAILER

Elbert C. Messick and Ira W. Wright, Baytown, Tex., assignors of ten per cent to Richard A. Messick, Baytown, Tex.

Application October 31, 1950, Serial No. 193,075

2 Claims. (Cl. 296—23)

This invention relates to new and useful improvements in boat trailers and the primary object of the present invention is to provide a boat trailer having a group of bed frames mounted thereon which are quickly and readily supported in a horizontal position whereby the trailer may be employed as a sleeping quarter for campers.

Another important object of the present invention is to provide a boat trailer including a wheeled frame having upstanding frame members mounted thereon over which a flexible covering is placed to protect a boat supported on the wheeled frame and which covering will also protect persons using the bed frames when the bed frames are lowered and the boat removed from the wheeled frame.

Yet another object of the present invention is to provide a boat trailer including a novel and improved wheel mounting whereby wheels may be applied to the main frame of the trailer.

A further object of the present invention is to provide a boat trailer including a plurality of vertically swingable bed frames and means for selectively supporting the bed frames horizontally or vertically.

A still further aim of the present invention is to provide a combined boat trailer and sleeper's shelter that is simple and practical in construction, strong and reliable in use, neat and attractive in appearance, inexpensive to manufacture, and otherwise well adopted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 3 is a rear elevational view of Figure 1;

Figure 4 is a view similar to Figure 3 but showing the bunks lowered, the boat removed and with dotted lines showing the canvas covering and also showing the covering supports mounted on the forward and rear U-shaped frame members;

Figure 5 is a top plan view of Figure 4;

Figure 6 is a side elevational view of Figure 4 and showing the canvas covering applied;

Figure 7 is an enlarged detail view showing the wheel mounting means used in the invention;

Figure 8 is an enlarged sectional view taken substantially on the plane of section line 8—8 of Figure 5;

Figure 1:
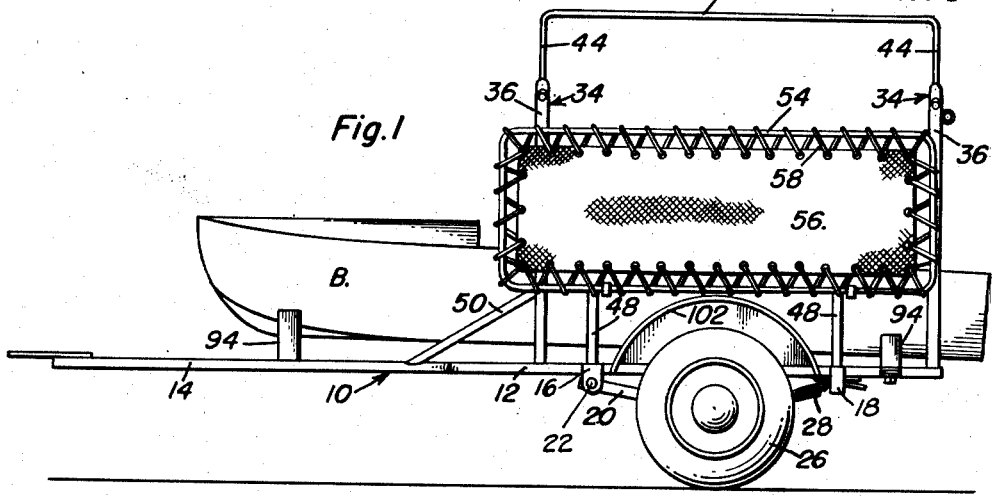
Figure 1 is a side elevational view of the present invention supporting a boat and showing the bunks raised and the covering removed.
Figure 2:
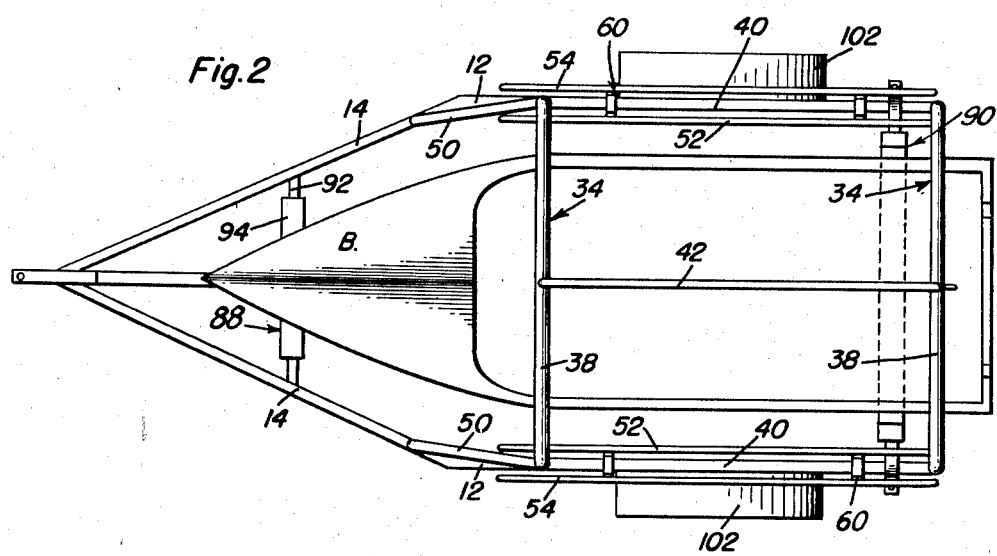
Figure 2 is a top plan view of Figure 1.

Referring now to the drawings in detail, wherein for the purpose of illustration, there is disclosed a preferred embodiment of the present invention, the numeral 10 represents a main wheeled frame including a pair of longitudinal side members 12 having forwardly converging extensions 14.

Forward and rear pairs of ears 16 and 18 are suitably fixed, by welding or the like, to the side members 12 and depend from the side members 12, as shown best in Figure 7. The forward ends of a pair of arms 20 are secured between the pairs of ears 16 by horizontal pins or rivets 22 and the rear ends of the arms 20 support horizontal stub axles 24 on which wheels 26 are mounted. The forward ends of leaf springs 28 are secured to the rear ends of the arms 20 by clamps 30 and the rear ends of the leaf springs 28 are received between the pairs of ears 18 and contact wear plates 32 fixed to the undersurfaces of the members 12 between the pairs of ears 18.

A pair of longitudinally spaced inverted U-shaped frame members 34 are supported on and rise from the frame 10. These frame members 34 are each provided with a pair of vertical portions 36 and a horizontal portion 38 joining the upper ends of the vertical portions. The lower ends of the vertical portions 36 are fixed by welding or the like to the side members 12 and the U-shaped frame members are disposed transversely of the main frame 10.

Longitudinal beams 40 are terminally fixed by welding or the like to the vertical portions of the frame members 34 and overlie the side members 12. A center beam 42 extends between and over the frame members 34, and includes depending end portions 44 that are fixed by welding or the like to the horizontal portions 38 medially the ends of the horizontal portions 38. Crossbars 46 underlie and parallel the horizontal portions 38 and are terminally fixed to the upper ends of the vertical portions 36.

The beams 40 are braced to the side members 12 by vertical posts 48, and the vertical portions 36 of the forward most of the frame members 34 are braced to the converging extension 14 by inclined brace arms 50.

Inner and outer pairs of substantially rectangular tubular bed frames 52 and 54 are mounted on the beams 40 for vertical swinging movement. These frames 52, 54 support canvas bed bottoms 56 that are secured to the bed frames and within the openings in the bed frames through the medium of cords 58 that are trained about the bed frames and back and forth through eyelets mounted on the bottoms 56.

Undulated straps 60 constitute the means for pivotally securing the bed frames to the beams 40. These straps 60 include central channels 62 that seat upon the beams 40 and end channels 64 and 66 that receive the adjacent longitudinal rails 52a and 54a of the bed frames to permit raising and lowering of the bed frames in the direction of arrows A in Figure 8. A retainer strap 68 overlies each of the straps 60 and the ends of the straps 68 overlie the channels 64, 66 to retain the rails 52a, 54a in the channels 64, 66. The straps 60 and 68 are secured to the beams 40 by fasteners 70.

The inner rails of the bed frames 52 each support a pair of eyes 72 that engage the lower ends of flexible hangers on chains 74. Hooks 76 depend from the cross-bars 46 and engage the upper ends of the chains 74 to support the frames 52 horizontally as shown in Figure 4. When the frames 52 are raised, they are retained raised by the wrapping of the chains 74 about the vertical portions 36 and cross-bars 46 and then fastened to the bed frames.

Additional hooks or eyes 78 rise from the outer rails of the bed frames 54 and engage the lower ends of outer flexible hangers or chains 80 whose upper ends engage hooks 82 on the upper ends of the vertical portions 36. The chains 80 are wrapped about the portions 36 and the cross-bars 46 and then suitably attached to the frames 54 to support the bed frames 54 raised.

Figure 9:
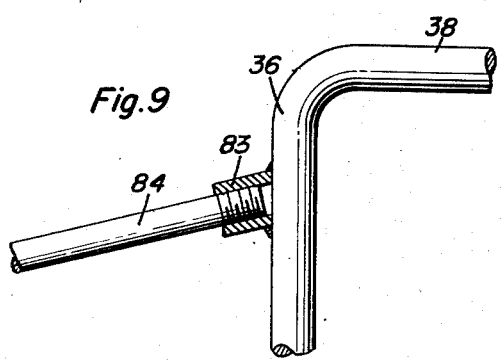
Figure 9 is an enlarged detail view, partly in elevation and partly in section, showing the manner in which the canvas supports are secured to the U-shaped frame members; and, Figure 10 is a view showing the manner in which the boat supports are mounted on the main frame, the main frame being shown in section.

A downwardly and outwardly inclined socket member 83 is fixed by welding or the like to the upper end of each vertical portion 36 and threadingly receive the inner ends of downwardly and outwardly inclined support members or arms 84, as shown best in Figure 9 of the drawings.

A canvas or flexible covering 86 is disposed over the beam 42, the frames 34 and the arms 84. The covering 86 is tied to the arms 84 and to the main frame at suitable points to retain the covering relatively tight to shield and protect the bunks (52, 54, 56, 58).

Boat supporting members 88 and 90 extend transversely of the main frame 10. Each of the members 88, 90 includes an elongated strap 92 to which a cross-beam 94 is secured. The upper faces of the cross-beam 94 slope downwardly from the ends of the cross-beam 94 to form V-seats 96 for a boat B. The ends of the rear most of the straps 92 is secured to laterally projecting arms 98 on the members 12 by bolts 100 and the ends of the forward most of the straps 92 is secured to the extensions 14.

Fender shields 102 are suitably fixed to the side members 12 and embrace the wheel 26.

In practical use of the present invention for carrying a boat, the bed frames are just raised and the chains 74 and 80 placed to support the bed frames raised. The boat B is then placed upon the cross-bars or blocks 94 and the covering 86 applied and tied to protect the boat.

When the invention is used as a sleeping shelter, the arms 84 are mounted in the socket members 83 to extend and support the covering over the outer pair of bed frames 54 and all bed frames are lowered to their horizontal position to accommodate four persons.

Having described the invention, what is claimed as new is:

1. A boat trailer comprising a wheeled frame, forward and rear inverted U-shaped frame members mounted on and rising from the frame, each of said frame members including a pair of vertical portions and a horizontal portion joining the upper ends of said vertical portions, inner and outer pairs of bed frames extending between said frame members, means mounting said bed frames on the vertical portions of said frame members to permit vertical swinging movement of the bed frames, and means connecting the bed frames to the frame members for selectively supporting the bed frames horizontally and vertically, said means mounting said bed frames on said frame members including a pair of tubular beams terminately secured to the respective vertical portions of the corresponding forward and rear frame members and joining said frame members, a pair of undulated straps mounted on each beam, said straps each including a central channel and end channels, fasteners securing said central channels to the beams, said bed frames each having a tubular side rail mounted in said end channels for rotation, and means secured to said beams by said fasteners for retaining said side rails in said end channels.

2. A boat trailer comprising a wheeled frame forward and rear inverted U-shaped frame members mounted on and rising from the frame, each of said frame members including a pair of vertical portions and a horizontal portion joining the upper ends of said vertical portions, inner and outer pairs of bed frames extending between said frame members, means mounting said bed frames on the vertical portions of said frame members to permit vertical swinging movement of the bed frames, and means connecting the bed frames to the frame members for selectively supporting the bed frames horizontally and vertically, said means mounting said bed frames on said frame members including a pair of tubular beams terminately secured to the respective vertical portions of the corresponding forward and rear frame members and joining said frame members, a pair of undulated straps mounted on each beam, said straps each including a central channel and end channels, fasteners securing said central channels to the beams, said bed frames each having a tubular side rail mounted in said end channels for rotation, and a plurality of retainer straps secured to said beams by said fasteners and overlying said rails and said central and end channels to retain the rails in the end channels during raising and lowering of said bed frames.

ELBERT C. MESSICK.
IRA W. WRIGHT.

References Cited in the file of this patent

UNITED STATES PATENTS

| Number | Name | Date |
|---|---|---|
| 1,022,588 | Hylton | Apr. 9, 1912 |
| 1,258,694 | Miller | Mar. 12, 1918 |
| 1,280,840 | Reid | Oct. 8, 1918 |
| 1,564,257 | Lippman | Dec. 8, 1925 |
| 1,648,086 | Watson | Nov. 8, 1927 |
| 1,671,457 | Wiedman | May 29, 1928 |
| 2,465,098 | Inskeep | Mar. 22, 1949 |
| 2,481,230 | MacDonald | Sept. 6, 1949 |
| 2,507,980 | Knapp | May 16, 1950 |
| 2,543,349 | Britton | Feb. 27, 1951 |